US012531354B2

(12) United States Patent
Zebhauser et al.

(10) Patent No.: US 12,531,354 B2
(45) Date of Patent: Jan. 20, 2026

(54) OUTER-CONDUCTOR CONTACT ELEMENT, RIGHT-ANGLE PLUG CONNECTOR AND METHOD FOR PRODUCING A RIGHT-ANGLE PLUG CONNECTOR

(71) Applicant: Rosenberger Hochfrequenztechnik GmbH & Co. KG, Fridolfing (DE)

(72) Inventors: Martin Zebhauser, Laufen (DE); Thomas Miedl, Garching (DE); Till Bredbeck, Siegsdorf (DE); Christian Anfang, Bergen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 331 days.

(21) Appl. No.: 18/011,552

(22) PCT Filed: Jun. 17, 2021

(86) PCT No.: PCT/EP2021/066389
§ 371 (c)(1),
(2) Date: Dec. 20, 2022

(87) PCT Pub. No.: WO2022/002611
PCT Pub. Date: Jan. 6, 2022

(65) Prior Publication Data

US 2023/0291130 A1 Sep. 14, 2023

(30) Foreign Application Priority Data

Jul. 3, 2020 (DE) ..................... 10 2020 117 663.5

(51) Int. Cl.

| | |
|---|---|
| ***H01R 4/18*** | (2006.01) |
| ***H01R 43/04*** | (2006.01) |
| *H01R 9/05* | (2006.01) |

(52) U.S. Cl.
CPC ............. *H01R 4/184* (2013.01); *H01R 43/04* (2013.01); *H01R 9/0518* (2013.01); *H01R 2201/26* (2013.01)

(58) Field of Classification Search
CPC ...... H01R 4/184; H01R 43/04; H01R 9/0518; H01R 2201/26; H01R 13/6592; H01R 43/16; H01R 2103/00
See application file for complete search history.

(56) References Cited

U.S. PATENT DOCUMENTS 3,771,111 A * 11/1973 Pritulsky ............. H01R 43/058 439/867
4,298,243 A * 11/1981 Swengel, Jr. ........ H01R 13/115 439/881

(Continued)

FOREIGN PATENT DOCUMENTS

DE 3836141 A1 4/1990
DE 10232662 A1 1/2004

(Continued)

*Primary Examiner* — Truc T Nguyen
(74) *Attorney, Agent, or Firm* — Dickinson Wright PLLC

(57) ABSTRACT

The invention relates to an outer-conductor contact element (2) for a right-angle plug connector (1). The right-angle plug connector (1) has a crimping portion (9) for pressing the outer-conductor contact element (2) onto an electric cable (4), said crimping portion (9) having a free end (10), which is open at the end side, for receiving the cable (4). The right-angle plug connector (1) further has a sleeve-like contact portion (12) having a free end (13), which is open at the end side, for establishing a connection with a corresponding mating plug connector, wherein an exit angle (α) is formed between a first longitudinal axis ($L_1$) of the contact portion (12) and a second longitudinal axis ($L_2$) of the crimping portion (9). The right-angle plug connector (1) also has a tub-shaped transition region (14) which, starting from the crimping portion (9), extends along the second longitu- (Continued)

Figure 1:
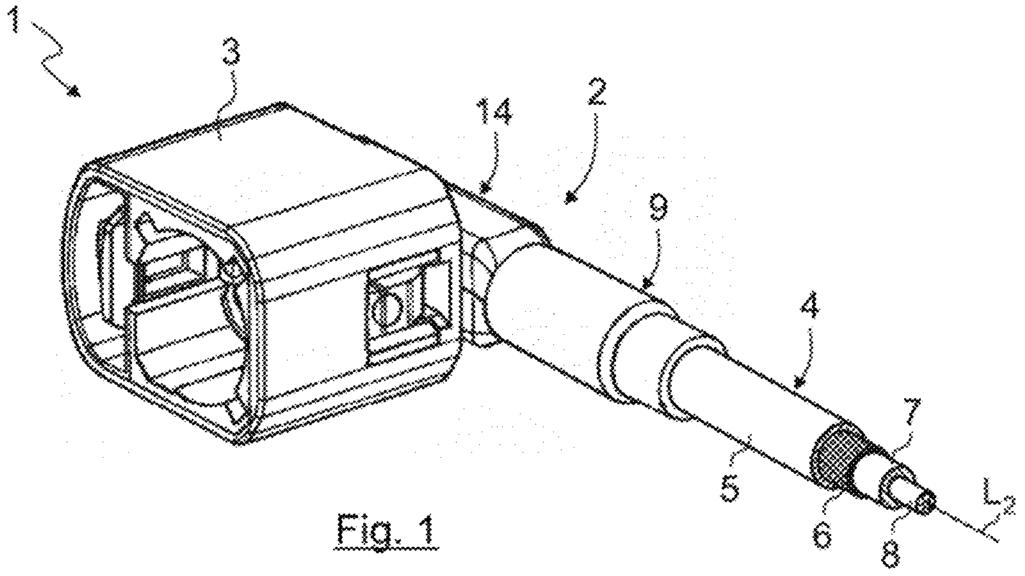

dinal axis ($L_2$) of the crimping portion (9) as far as the contact portion (12). The crimping portion (9), the contact portion (12) and the transition region (14) are formed in one piece from a deep-drawn sheet-metal part.

20 Claims, 4 Drawing Sheets

(56) References Cited

U.S. PATENT DOCUMENTS

| | | | | |
|---|---|---|---|---|
| 4,911,660 A * | 3/1990 | Alf | H01R 9/0518 | 439/585 |
| 5,575,681 A * | 11/1996 | Muzslay | H01R 13/5829 | 439/459 |
| 6,203,386 B1 * | 3/2001 | Checchinato | H05K 3/326 | 439/877 |
| 8,057,261 B1 * | 11/2011 | DeSio | H01R 13/506 | 439/694 |
| 8,997,346 B2 * | 4/2015 | Omae | H01R 9/0518 | 439/597 |
| 10,468,791 B1 * | 11/2019 | Humphrey | H01R 11/12 | |
| 10,927,550 B1 * | 2/2021 | Cline | E04D 13/143 | |
| 2002/0187686 A1 * | 12/2002 | Zhao | H01R 11/22 | 439/843 |
| 2009/0318018 A1 * | 12/2009 | Mulfinger | H01R 9/0518 | 439/578 |
| 2010/0075528 A1 * | 3/2010 | Ngo | H01R 4/183 | 439/372 |
| 2013/0171890 A1 * | 7/2013 | Sugie | H01R 13/33 | 439/884 |
| 2013/0210292 A1 * | 8/2013 | Schmidt | H01R 4/06 | 439/775 |
| 2015/0162689 A1 | 6/2015 | Matoba et al. | | |
| 2015/0380834 A1 * | 12/2015 | Seipel | H01R 4/182 | 439/877 |
| 2016/0056582 A1 * | 2/2016 | Cox | H01R 13/506 | 439/607.01 |
| 2018/0026408 A1 * | 1/2018 | Ensley | H01R 24/38 | 439/578 |
| 2020/0203859 A1 * | 6/2020 | Haga | H01R 4/185 | |
| 2023/0318234 A1 * | 10/2023 | Evans | H01R 13/65914 | 439/567 |
| 2024/0313488 A1 * | 9/2024 | Schnobrich | H01R 13/432 | |

FOREIGN PATENT DOCUMENTS

| | | |
|---|---|---|
| DE | 202008014409 U1 | 1/2009 |
| DE | 102019200286 B3 | 6/2020 |
| EP | 1378971 A1 | 1/2004 |
| EP | 3379659 A1 | 9/2018 |

* cited by examiner

OUTER-CONDUCTOR CONTACT ELEMENT, RIGHT-ANGLE PLUG CONNECTOR AND METHOD FOR PRODUCING A RIGHT-ANGLE PLUG CONNECTOR

CROSS-REFERENCE TO RELATED APPLICATIONS

This application is a U.S. National Stage of International Application No. PCT/EP2021/066389, filed on Jun. 17, 2021, which claims the benefit and priority of German Patent Application No. 10 2020 117 663.5, filed on Jul. 3, 2020, the entire contents of which are incorporated herein by reference.

The invention relates to an outer-conductor contact element for a right-angle plug connector having a crimping portion for pressing the outer-conductor contact element onto an electrical cable, a sleeve-shaped contact portion for establishing a connection to a corresponding mating plug connector, and a trough-shaped transition region extending from the crimping portion to the contact portion, according to the preamble of claim 1.

The invention further relates to a right-angle plug connector and a method for producing a right-angle plug connector.

Various electrical plug connectors are known from electrical engineering. Electrical plug connectors are known to transmit electrical supply signals and/or data signals to corresponding mating plug connectors. A plug connector or mating plug connector may be a plug, a printed circuit board plug connector, a male panel plug connector, a socket, a coupling or an adapter. The designation “plug connector” or “mating plug connector” used in the context of the invention is representative of all variants.

High demands are placed on the robustness and safety of plug connectors for the automotive industry and vehicles in particular. For example, a plug connection must sometimes withstand high loads, such as mechanical stresses, and must remain closed in a defined manner so that the electrical connection is not disconnected unintentionally, for example during operation of the vehicle. In particular in the autonomous operation of vehicles and for driver assistance systems, ensuring safety is a priority.

Sometimes, when a vehicle is operated autonomously or assistance systems are used, large amounts of data from several cameras, various sensors and navigation sources have to be combined and trans-ported, usually in real time. Accordingly, the operation of many devices, screens and cameras requires a high-performance infrastructure in the vehicle electronics. Accordingly, the demands on the plug connectors and cable connections within a vehicle with regard to the required data rate are now very high. To save installation space and weight, it is also important to make the plug connectors as compact as possible.

Another requirement for plug connectors for the automotive industry is that they should be economically producible in high volumes and able to be assembled easily and reliably.

A particularly advantageous plug connector for the transmission of high-frequency electrical signals is known from document DE 20 2008 014 409 U1, which lies in the same field. The HF right-angle plug connector of DE 20 2008 014 409 U1 has an outer-conductor contact element and an inner-conductor contact element, wherein the inner-conductor contact element has a fastening element for mechanical and electrical connection to an inner conductor of a coaxial cable, and wherein the outer-conductor contact element has a cable-side end, at which the coaxial cable is arranged, and an end face opposite the cable-side end, through which a longitudinal axis of the assembled coaxial cable intersects.

In DE 20 2008 014 409 U1, it is proposed that the outer-conductor contact element of the HF right-angle plug connector be formed in one piece from a stamped and bent part in order to achieve good electrical properties, especially with regard to shielding efficiency.

In the course of cost savings, the one-piece design of plug connector components of a plug connector is advantageous. However, a one-piece design can make final assembly of the plug connector more difficult, especially in the case of a right-angle plug connector. The assembly of the right-angle plug connector of DE 20 2008 014 409 U1 is thus comparatively complex.

In addition, there is now a need to increase the data rates for signal transmission even further. For example, frequency ranges of 9 GHz and beyond are now not uncommon for some applications. In this context, it has become apparent that the electrical properties of the right-angle RF plug connector proposed in DE 20 2008 014 409 U1 also need to be further improved.

In view of the known prior art, the object of the present invention is to provide an outer-conductor contact element which is particularly suitable for use in a right-angle plug connector for transmitting particularly high-frequency electrical signals, and which can preferably be manufactured and assembled cost-effectively.

A further object of the present invention is that of providing a right-angle plug connector which is particularly suitable for transmitting especially high-frequency electrical signals and which can preferably be produced and assembled cost-effectively.

Lastly, it is also an object of the invention to provide an advantageous method for producing a right-angle plug connector.

The object is achieved for the outer-conductor contact element having the features described in claim 1. With respect to the right-angle plug connector, the object is achieved by the features of claim 20. With respect to the method, the object is achieved by the features of claim 15.

The dependent claims and the features described below relate to advantageous embodiments and variants of the invention.

An outer-conductor contact element for a right-angle plug connector is provided.

The outer-conductor contact element has a crimping portion for pressing the outer-conductor contact element onto an electrical cable. The crimping portion comprises a free end, which is open at the end face, for receiving the cable.

The crimping portion can thus be configured to provide a fastening of the outer-conductor contact element on the cable. For this purpose, the cable can be inserted into the free end of the crimping portion that is open at the end face, and the crimping portion can then be pressed or crimped onto the cable, for example using a pressing tool or crimping pliers.

Preferably, a sleeve-shaped crimping portion (in the pressed state) is provided. However, a sleeve-shaped crimping portion or a crimping portion that is completely closed along the circumference in the crimped state is not absolutely necessary.

The crimping portion preferably extends coaxially to an axis of symmetry of the electrical cable received in the crimping portion.

The crimping portion can be configured to be pressed directly or indirectly onto the cable. In particular, the crimping portion can be crimped onto a support sleeve, which in turn can be crimped or pressed onto the cable. The crimping portion and/or the support sleeve are preferably pressed or crimped onto an exposed outer conductor of the cable, in particular a cable shielding braid. The outer conductor or the cable shielding braid of the cable can in particular also be folded back over the support sleeve in order to provide a particularly high-quality mechanical and electrical connection of the outer-conductor contact element to the outer conductor of the electrical cable. However, the crimping portion and/or the support sleeve can also be pressed or crimped onto a cable sheath of the cable or another cable component of the cable, at least in some regions.

The outer-conductor contact element also has a sleeve-shaped contact portion with a free end, which is open at the end face, for establishing a connection to a corresponding mating plug connector. An exit angle is formed between a first longitudinal axis of the contact portion (preferably a central axis of the contact portion) and a second longitudinal axis of the crimping portion.

The contact portion is configured for direct or indirect connection to the corresponding mating plug connector.

The exit angle of the right-angle plug connector fitted with the outer-conductor contact element preferably corresponds to the exit angle between the first longitudinal axis of the contact portion and the second longitudinal axis of the crimping portion.

The contact portion has its free end facing the mating plug connector (when the mating plug connector is connected to the right-angle plug connector). The crimping portion has its free end facing the cable (when the cable is received in the crimping portion). The crimping portion may also be referred to as the "cable side" component of the outer-conductor contact element, and the contact portion may be referred to as the "plug-side" component of the outer-conductor contact element.

The outer-conductor contact element further comprises a trough-shaped transition region extending from the crimping portion along the second longitudinal axis of the crimping portion to the contact portion.

The transition region is thus formed at least between the crimping portion and the contact portion. Preferably, the crimping portion and/or the contact portion transition directly into the transition region.

Preferably, the first longitudinal axis of the contact portion and the second longitudinal axis of the crimping portion intersect within the transition region.

An insulating part of the right-angle plug connector can preferably be mounted in the transition region. The insulating part can be configured to receive at least one inner conductor of the electrical cable and/or at least one inner-conductor contact element of the right-angle plug connector. The transition region can preferably provide the fastening of the at least one inner-conductor contact element of the plug connector to the at least one inner conductor of the electrical cable.

According to the invention, the crimping portion, the contact portion and the transition region are formed in one piece from a deep-drawn sheet-metal part.

To improve the electrical properties of the outer-conductor contact element, it can be advantageous to form the outer-conductor contact element with its individual portions or regions in one piece from a sheet-metal part.

The inventors have recognized that the usual production of the outer-conductor contact element as a stamped and bent part is not suitable for use in an outer-conductor contact element for use in a right-angle plug connector for transmitting particularly high frequencies. The characteristic seams resulting for a stamped and bent part, which extend through the component, especially in the region of the contact portion, may be disadvantageous for the transmission of the electromagnetic wave in the right-angle plug connector.

On the other hand, an outer-conductor contact element formed in one piece from a deep-drawn sheet-metal part can be electrically optimized with regard to the seams.

In addition to the electrical properties, the mechanical stability of the proposed deep-drawn outer-conductor contact element can also be improved.

In an advantageous development of the invention, it can be provided that the transition region has a base plate with a recess from which the contact portion extends in the direction of the mating plug connector.

The base plate preferably runs parallel to the second longitudinal axis of the crimping portion.

Preferably, the contact portion extends from the base plate of the transition region in the manner of a drain opening.

According to a development of the invention, it may be provided that the transition region on the side of the base plate facing away from the contact portion has two oppositely extending side walls, each connected to the base plate, which transition directly into the crimping portion.

Preferably, the mutually opposing side walls run parallel to each other. Particularly preferably, the side walls also run parallel to the second longitudinal axis of the crimping portion.

It may be provided that the side walls extend orthogonally upwards from the base plate. However, an angle other than 90° can also be provided, along which the side walls extend from the base plate; in particular, the side walls can each be inclined outwardly.

According to a development of the invention, it can be provided that the transition region has at least one shielding flap formed on the side of the base plate facing away from the contact portion.

Preferably, the at least one shielding flap extends from a side wall of the transition region.

The at least one shielding flap can be bent from an open pre-assembly state, in which an interior of the transition region is accessible toward the side of the base plate facing away from the contact portion, to a closed assembly state, in which the at least one shielding flap provides a circumferential electromagnetic shielding in the transition region when viewed in cross-section.

Preferably, the at least one shielding flap is curved outwardly in its open pre-assembly state.

Due to the at least one shielding flap, the assembly of further plug connector components of the plug connector, which are to be arranged within the outer-conductor contact element, can be significantly simplified. Whereas in the known prior art the assembly of, for example, an insulating part must already be carried out during the production of the stamped and bent part, since subsequent insertion into the finished stamped and bent part is no longer possible due to the exit angle, the now proposed "rear" opening (i.e. facing away from the contact portion) of the outer-conductor contact element in the transition region allows the assembly to be carried out simply and precisely during the final assembly of the right-angle plug connector.

It can be provided to close the transition region only as part of the final assembly and not already as part of the production of the outer-conductor contact element.

In a development of the invention, it can be provided that two opposing shielding flaps are provided, wherein the shielding flaps are bendable towards each other starting from their respective pre-assembly states to their respective assembly states to provide the circumferential electromagnetic shielding.

In particular, the use of exactly two shielding flaps has proven to be particularly advantageous. The use of two shielding flaps opposite each other can facilitate access to an interior of the outer-conductor contact element for assembly. Due to the symmetry, the electrical properties of the finished, assembled outer-conductor contact element can also be improved.

In a development of the invention, it can be provided that the shielding flaps overlap each other at a seam in the assembly state or are pressed together in such a way that a wedge-shaped seam is formed.

In order to reduce or even eliminate an axial gap between the shielding flaps in their closed assembly state, the shielding flaps can each be formed with an "overlength" to cause an overlap or a wedge-shaped or bead-like material distortion during pressing.

The bending or pressing process during pressing of the crimping portion and bending of the shielding flaps is preferably performed with such a pressing force that the shielding flaps are plastically deformed in the region of the axial seam and/or the end wall of the transition region. In this way, an almost gap-free or seamless transition can be provided between the two shielding flaps and/or the end wall.

In an advantageous development of the invention, it can be provided that the at least one shielding flap has a semicircular or semi-elliptical course in its assembly state. In particular, the transition region together with the base plate may form a substantially semicircular or semi-elliptical geometry when viewed in cross-section (preferably a self-contained geometry) when the at least one shielding flap is in its assembly state.

A semicircular or semi-elliptical course of the shielding flaps has proven particularly suitable for stability reasons and to save installation space.

In a development of the invention, it can be provided that the transition region has an end wall, at an end opposite the free end of the crimping portion along the second longitudinal axis of the crimping portion, for providing end-face electromagnetic shielding.

Preferably, the end wall is directly connected to the base plate or transitions into the base plate.

The end wall can extend orthogonally to the base plate, but in principle it can also extend at an angle other than 90° from the base plate.

Preferably, it can be provided that the end wall is formed in one piece with the crimping portion, the contact portion and the transition region.

In an advantageous development of the invention, it can be provided that the end wall extends starting from the side of the base plate facing away from the contact portion. Preferably, the end wall also transitions directly into the side walls of the transition region.

Preferably, the end wall can already be in its final position and orientation immediately after the deep-drawing process.

In an advantageous development of the invention it can be provided that the end wall forms a completely closed surface.

In particular, it can be provided that the end wall is not of the bendable tab type and thus has no seams for optimized electromagnetic shielding.

In an advantageous development of the invention it can be provided that the end wall forms a support surface for the at least one shielding flap in the assembly state of the at least one shielding flap.

The support surface is formed in particular on the upper side of the end wall or on the end of the end wall projecting upwards and facing away from the base plate.

The fact that the at least one shielding flap rests on the support surface of the end wall means that the electromagnetic shielding can be optimized by the end wall.

In a development of the invention it can be provided that the ("upper") end of the end wall facing away from the base plate or forming the contact surface has a convex course between the two side walls.

Preferably, the height profile or the course of the upper end of the end wall follows the inner cross-sectional geometry of the at least one shielding flap when the shielding flap is in its assembly state. In this case, the at least one shielding flap can rest optimally on the support surface of the end wall.

According to a development of the invention it can be provided that the support surface of the end wall has at least one hump-like elevation around which one of the shielding flaps can be bent.

It has been found that the at least one shielding flap bends or springs back slightly after being bent into its assembly state due to a basic elasticity inherent in the material. In particular, this can widen an axial gap running between two shielding flaps or an axial seam between the shielding flaps.

It has been shown that a hump-like elevation on the support surface of the end wall can counteract the spring-back of the shielding flaps. The punctiform, hump-like elevation can optimize plastic deformation by introducing a punctiform bend into the shielding flap.

In an advantageous development of the invention it can be provided that the crimping portion has at least one crimping tab. The at least one crimping tab can be pressable on the cable starting from an open preassembly state until an assembly state is reached in which the at least one crimping tab forms a circumferential pressing on the cable as viewed in cross-section.

The embodiment of a crimping portion with one or more crimping tabs is known in principle and has proven itself for use with outer-conductor contact elements.

In an advantageous development of the invention, two opposing crimping tabs in particular can be provided, wherein the crimping tabs can be bent over towards each other for circumferential pressing starting from their respective pre-assembly states into their respective assembly states.

In principle, even more crimping tabs can be provided and arranged distributed along the second longitudinal axis of the crimping portion. However, it is particularly preferred to provide exactly two opposite crimping tabs in order to reduce the number of seams or transitions in the outer-conductor contact element.

According to a development of the invention it can be provided that the crimping tabs have a mutual toothing that engages in itself in the assembly state of the crimping tabs.

The use of mutual toothings can help increase mechanical stability and also improve the electrical properties.

In one embodiment of the invention, it can also be provided that the shielding flaps have a mutual toothing that engages in itself in the assembly state of the shielding flaps. Preferably, however, the shielding flaps do not have a mutual toothing.

Preferably, the crimping portion has a substantially round cross-section when the at least one crimping tab is in its assembly state.

In an advantageous development of the invention it can be provided that the contact portion has a round cross-section or an elliptical cross-section.

In principle, however, other cross-sections can also be provided, for example any oval or rectangular cross-sections, in particular a square cross-section. However, the use of a round or elliptical cross-section has proven to be particularly suitable.

In an advantageous development of the invention it can be provided that the contact portion has a seamlessly closed cross-section.

This can significantly improve the electrical properties and mechanical stability of the outer-conductor contact element. This is not possible when producing the outer-conductor contact element as a stamped and bent part.

In a development of the invention it can be provided that the exit angle is 90°.

In special cases, right-angle plug connectors or outer-conductor contact elements with exit angles other than 90° can also be provided. The exit angle of the outer-conductor contact element can therefore be arbitrary in principle. For example, the exit angle can be 20° to 90°, 30° to 90°, 40° to 90°, 45°, 50° to 90°, 60° to 90°, 70° to 90° or 80° to 90°.

In an advantageous development of the invention it can be provided that the outer-conductor contact element has a contact sleeve which can be mounted on or in the contact portion (preferably a contact sleeve which can be mounted coaxially) and which, in the region of its free end, has an interface for connection to a corresponding outer-conductor part of the mating plug connector.

The use of a contact sleeve can be advantageous, as it then allows universal connection to various mating plug connectors, each with different mechanical interfaces. The right-angle plug connector can then be adaptable easily or modularly.

In particular, the contact sleeve can be press-fitted in the contact portion.

In the region of its free end, the contact sleeve can, for example, have a spring cage and/or detent elements for latching with the corresponding outer-conductor part of the mating plug connector.

The contact sleeve preferably has a linear course and extends parallel, particularly preferably coaxially, to the first longitudinal axis of the contact portion.

Instead of using a contact sleeve, however, the contact portion (in particular in the region of its free end) can also have the interface for connection to the corresponding outer-conductor part of the mating plug connector, for example a spring cage and/or suitable detent elements. An additional contact sleeve is therefore not absolutely necessary.

The invention also relates to a right-angle plug connector having an outer-conductor contact element according to one of the preceding and following embodiments.

The right-angle plug connector can also have other plug connector components in addition to the outer-conductor contact element.

Preferably, the right-angle plug connector has an insulating part, particularly preferably an insulating part formed in one piece from a plastic. The insulating part can be mounted in the outer-conductor contact element.

The right-angle plug connector can also have one or more inner-conductor contact elements. The inner-conductor contact elements can be connectable, preferably pressable or crimpable, to at least one corresponding inner conductor of the electrical cable at a first end. The inner-conductor contact elements can be formed at a second end for contacting a corresponding inner-conductor part of the mating plug connector.

The at least one inner-conductor contact element can be accommodated in the insulating part or guided in the insulating part. Preferably, the at least one inner-conductor contact element is latched in the insulating part.

The inner-conductor contact element can be formed in one piece or in a number of pieces. Preferably, the inner-conductor contact element is formed in one piece.

The correct assembly of the plug connector components within the outer-conductor contact element, for example the correct latching and/or positioning of the insulating part and the at least one inner-conductor contact element, can advantageously be checked before the at least one crimping tab and/or the at least one shielding flap are bent over into their assembly state.

The right-angle plug connector can in principle also have other components, for example seals, fastening elements and support sleeves for fastening to the cable. Also, within the scope of the invention, the cable, in particular the cable end of the cable received in the outer-conductor contact element, can be considered as part of the outer-conductor contact element or the right-angle plug connector.

Preferably, the right-angle plug connector has exactly one inner-conductor contact element for fastening to exactly one inner conductor of the electrical cable. Particularly preferably, the electrical cable is configured as a coaxial cable.

The right-angle plug connector according to the invention can be used particularly advantageously within a vehicle, especially a motor vehicle. Possible fields of application are autonomous driving, driver assistance systems, navigation systems, “infotainment” systems, rear-seat entertainment systems, Internet connections and wireless gigabit (IEEE 802.11ad standard). Potential applications include high-resolution cameras, for example, 4K and 8K cameras, sensor systems, onboard computers, high-resolution screens, high-resolution dashboards, 3D navigation devices, and cellular devices. The term “vehicle” describes here any means of transportation, in particular vehicles on land, water or in the air, including space vehicles.

The right-angle plug connector according to the invention, however, is suitable for any applications within the entire field of electrical engineering and is not to be understood as being restricted to use in automotive engineering.

Preferably, the right-angle plug connector is configured as a plug connector of the FAKRA standard. However, the electrical right-angle plug connector is not limited to a specific plug connector type, wherein the invention is particularly suitable for right-angle plug connectors for high-frequency technology. In particular, they may be right-angle plug connectors of the PL, BNC, TNC, SMBA (FAKRA), SMA, SMB, SMS, SMC, SMP, BMS, HFM (FAKRA-Mini), H-MTD, BMK, Mini-Coax or MATE-AX standard. In addition to an HFM right-angle plug connector, the invention may also be particularly advantageous for forming an H-MTD right-angle plug connector.

The invention also relates to a plug connection comprising a right-angle plug connector according to the foregoing and following embodiments, and a mating plug connector for connection to the right-angle plug connector.

The invention also relates additionally to a method for producing a right-angle plug connector, according to which an outer-conductor contact element is deep-drawn from a sheet-metal part. The outer-conductor contact element is deep-drawn in such a way that the outer-conductor contact element subsequently has a crimping portion for pressing the outer-conductor contact element onto an electrical cable, with a free end, which is open at the end face, for insertion of the cable. The deep-drawn outer-conductor contact element further comprises a sleeve-shaped contact portion for establishing a connection to a corresponding mating plug connector, with a free end which faces the mating plug connector and is open at the end face, wherein an exit angle is formed between a first longitudinal axis of the contact portion and a second longitudinal axis of the crimping portion. Furthermore, the deep-drawn outer-conductor contact element has a trough-shaped transition region that extends from the crimping portion along the second longitudinal axis of the crimping portion to the contact portion.

The proposed production method can make it possible to produce a right-angle plug connector suitable for transmitting high-frequency electrical signals cost-effectively and with only a short process time.

In an advantageous development of the invention it can be provided that a contact sleeve is mounted on or in the contact portion. The contact sleeve can have an interface for connection to a corresponding outer-conductor part of the mating plug connector.

In particular, the contact sleeve can be pressed into the contact portion. However, the use of a contact sleeve is not absolutely necessary; for example, the contact portion itself can also have an interface for contacting with the outer-conductor part of the mating plug connector.

According to a development of the invention it can be provided that an insulating part and/or at least one inner-conductor contact element are inserted into the outer-conductor contact element.

It can be provided that a pre-assembled electrical cable is inserted with its free end into the outer-conductor contact element.

After inserting the insulating part and/or the at least one inner-conductor contact element, the crimping portion can be pressed onto the electrical cable.

Preferably, shielding flaps arranged in the transition region are still open, i.e. in particular directed vertically upwardly, when the insulating part, the at least one inner-conductor contact element and/or the prefabricated electrical cable are inserted.

Preferably, as part of a preassembly of the electrical cable, the electrical cable is first freed from a cable sheath at its end intended for connection to the mating plug connector. A support sleeve can then be pressed or crimped onto an outer conductor of the cable, in particular onto a cable shielding braid of the cable. Optionally, the cable shield braid can be folded back over the support sleeve. It can also be provided to expose an inner conductor of the cable and to attach an inner-conductor contact element of the right-angle plug connector to the inner conductor, in particular to press or crimp it. Subsequently, the inner-conductor contact element can be inserted into the insulating part and optionally latched into the insulating part.

In principle, further method steps can also be provided within the scope of cable assembly, and method steps can be omitted or replaced. The above list and sequence of the cable assembly steps are only to be understood as being exemplary.

The electrical cable preassembled with the insulating part and the at least one inner-conductor contact element can lastly be inserted into the outer-conductor contact element, preferably after the optional contact sleeve is attached to the contact portion.

According to a development of the invention, it can be provided that simultaneously with the pressing of the crimping portion, the at least one shielding flap of the transition region is bent over from a pre-assembly state into an assembly state in which the at least one shielding flap provides a circumferential electromagnetic shielding in the transition region, as viewed in cross-section.

The shielding flaps can therefore preferably be closed synchronously with the pressing of the crimping portion. This can simplify the assembly process and also further reduce the process time.

In an advantageous development of the invention it can be provided that the crimping portion and the at least one shielding flap are pressed or bent over using a common pressing tool, in particular a crimping tool.

The use of a common pressing tool can further simplify assembly.

In a development of the invention it can be provided that the crimping portion and the at least one shielding flap are crimped or bent over in a controlled manner to adjust the impedance of the right-angle plug connector for its subsequent use.

In an advantageous manner, the right-angle plug connector can thus still be adaptable during the assembly process.

Features described in conjunction with one of the subjects of the invention, namely given by the outer-conductor contact element according to the invention, the right-angle plug connector according to the invention, the plug connection according to the invention and the method according to the invention, can also be advantageously implemented for the other subjects of the invention. Likewise, advantages mentioned in conjunction with one of the subjects of the invention can also be understood as relating to the other subjects of the invention.

It should also be noted that terms such as "comprising", "having" or "with" do not exclude other features or steps. Furthermore, terms such as "a" or "the" that indicate a singular number of steps or features do not exclude a plurality of features or steps—and vice versa.

However, in a purist embodiment of the invention, it may also be provided that the features introduced in the invention by the terms "comprising", "having" or "with" are enumerated exhaustively. Accordingly, one or more enumerations of features may be considered complete within the scope of the invention, for example each considered for each claim. For example, the invention may consist solely of the features described in claim 1.

It should be mentioned that designations such as "first" or "second" etc. are used primarily for reasons of distinguishability of respective device or method features and are not necessarily intended to indicate that features are mutually dependent or interrelated. Furthermore, the "outer conductor" component of the term "outer-conductor contact element" is not to be understood to mean that an inner conductor or an inner-conductor contact element must also necessarily be provided.

Furthermore, it should be emphasized that the values and parameters described herein include deviations or fluctuations of ±10% or less, preferably ±5% or less, further preferably ±1% or less, and most preferably ±0.1% or less of the designated value or parameter, provided that these deviations are not excluded in the implementation of the invention in practice. The specification of ranges by initial and final values also includes all those values and fractions which are included by the designated range, in particular the initial and final values and a corresponding mean value.

The invention also relates to an outer-conductor contact element independent of claim 1 for an electrical plug connector having a crimping portion for pressing the outer-conductor contact element onto an electrical cable and a contact portion for establishing a connection to a corresponding mating plug connector, wherein an exit angle is formed between a first longitudinal axis of the contact portion and a second longitudinal axis of the crimping portion, and wherein the crimping portion, the contact portion and the transition region are formed in one piece from a deep-drawn sheet-metal part. The further features of claim 1 and the dependent claims, as well as the features described in the present description, relate to advantageous embodiments and variants of this outer-conductor contact element.

Exemplary embodiments of the invention are described in greater detail below with reference to the drawing.

The figures each show preferred exemplary embodiments in which individual features of the present invention are shown in combination with one another. Features of one exemplary embodiment can also be implemented separately from the other features of the same exemplary embodiment and can accordingly be readily combined by a person skilled in the art to form further useful combinations and sub-combinations with features of other exemplary embodiments.

In the figures, functionally like elements are provided with the same reference signs.

Figure 2:
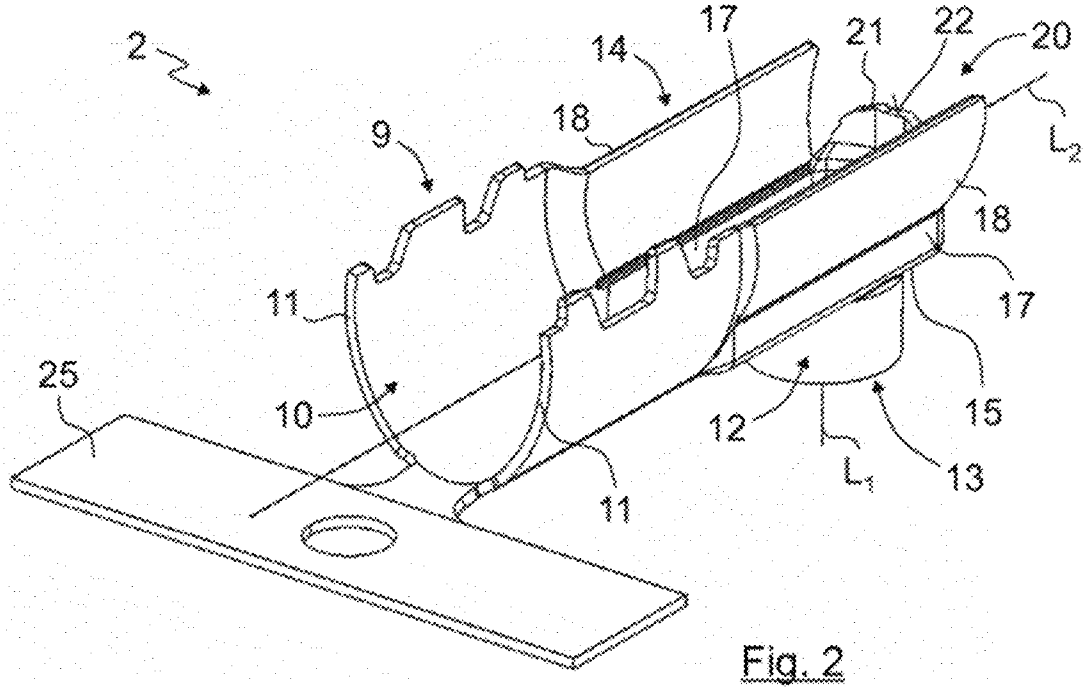
Figure 3:
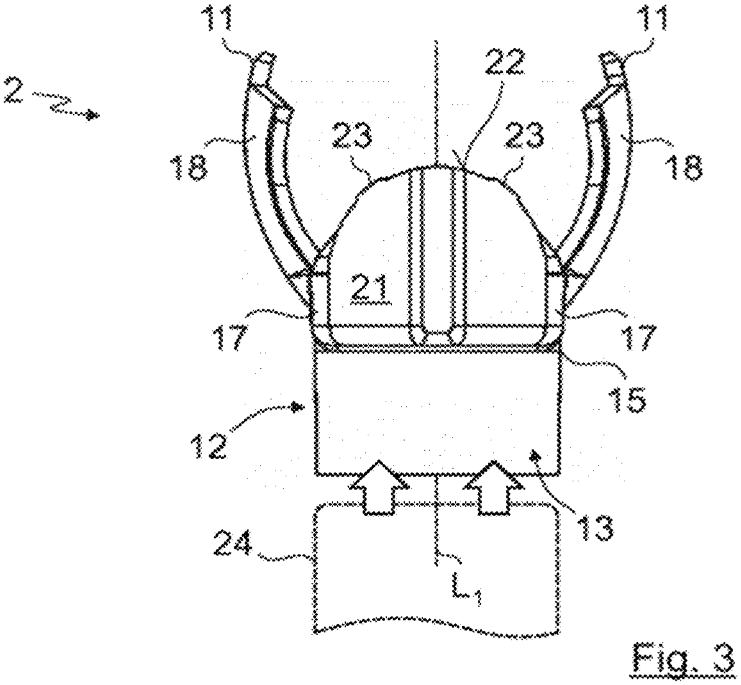
Figure 4:
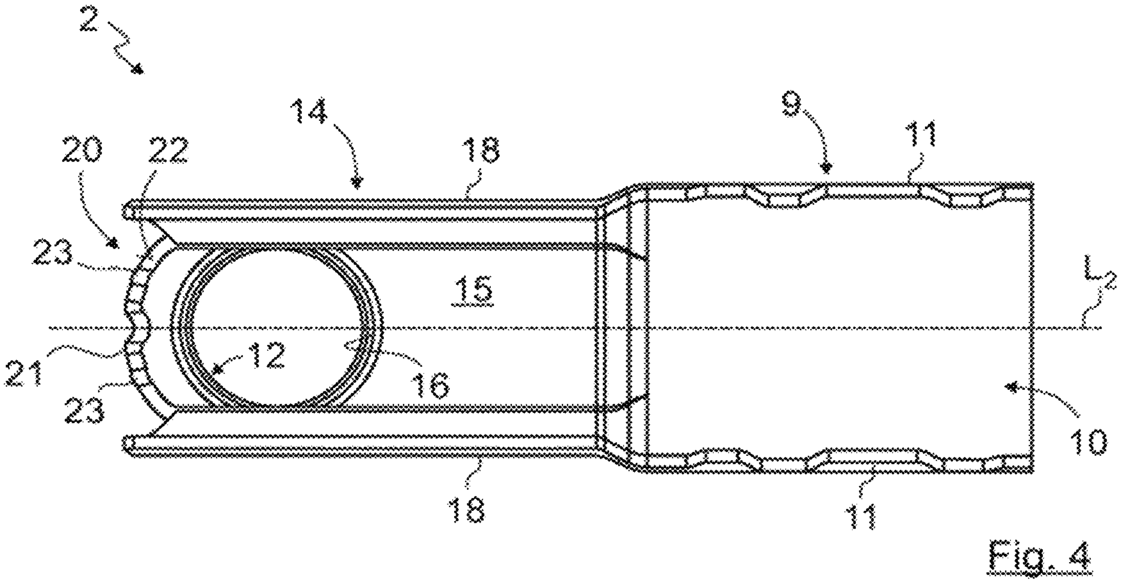
Figure 5:
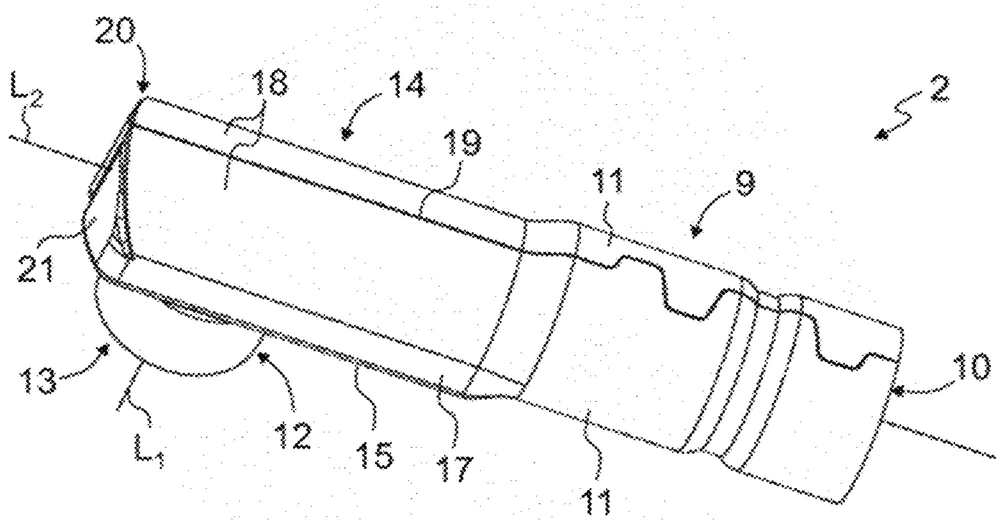
Figure 6:
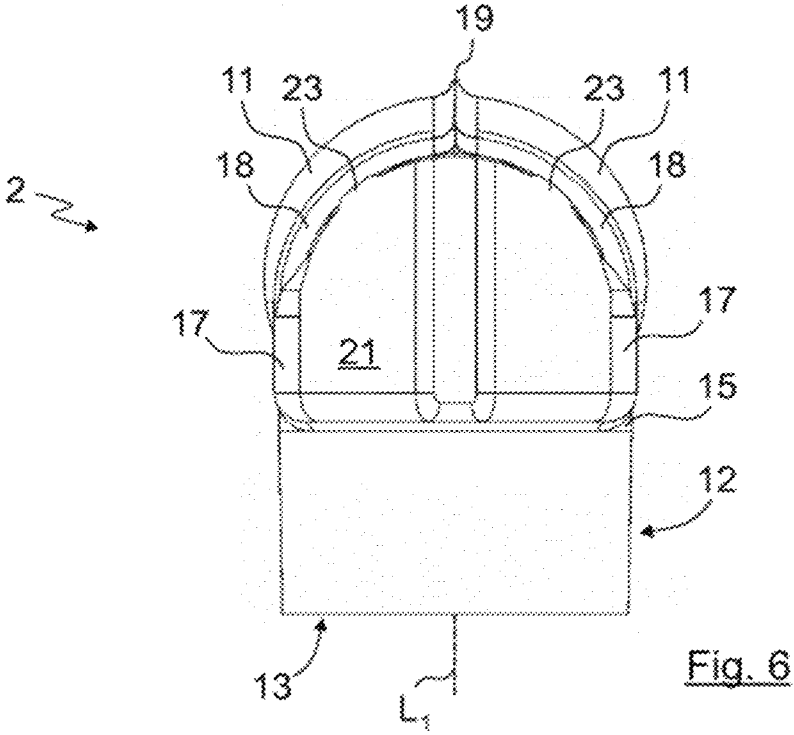
Figure 7:
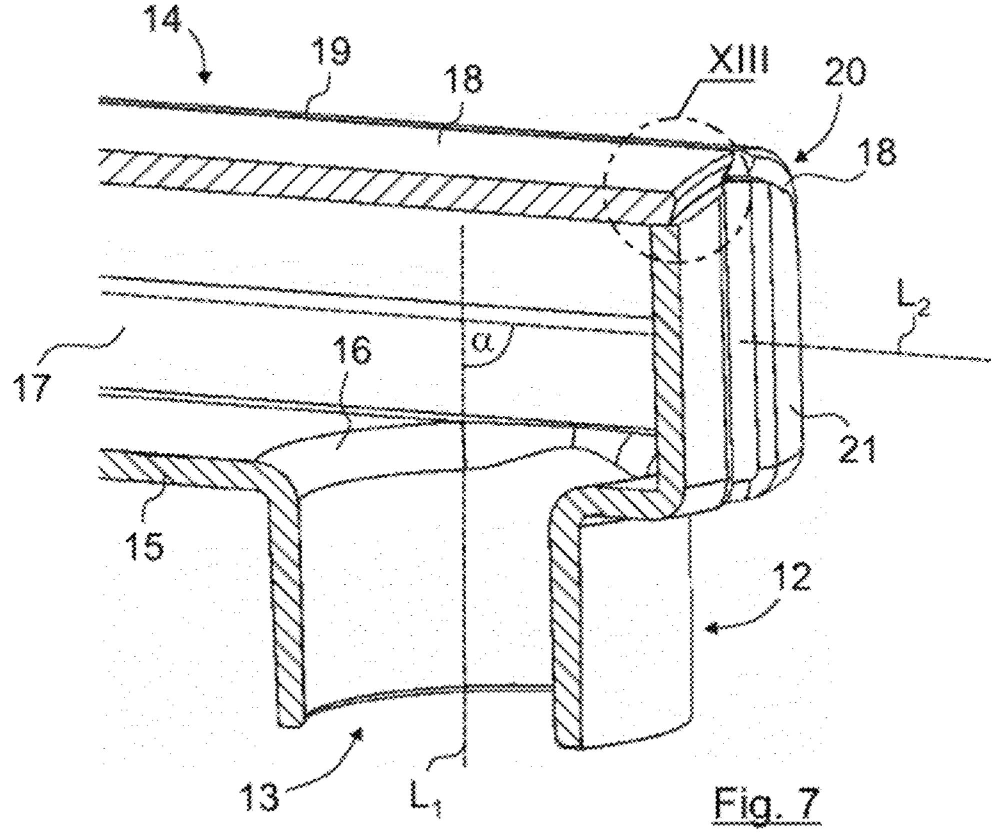
Figure 8:
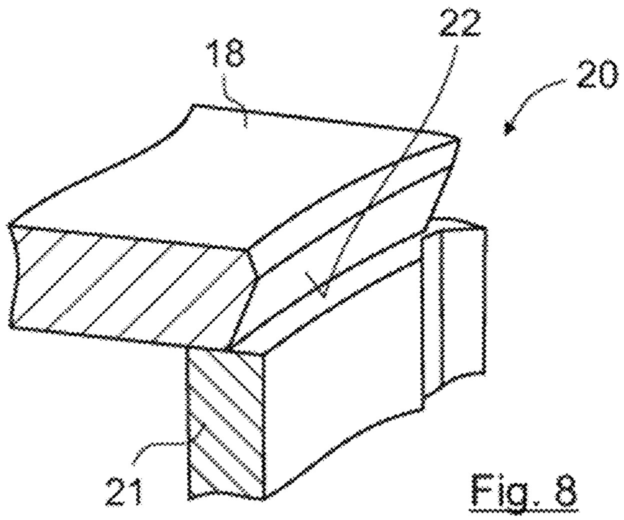

In the figures:

FIG. 1 schematically shows a right-angle plug connector according to the invention with an insulating housing assembly, an outer-conductor contact element and an electrical cable in a perspective view;

FIG. 2 schematically shows a perspective view of an outer-conductor contact element according to the invention with a crimping portion, a contact portion and a transition region extending therebetween in a pre-assembly state;

FIG. 3 schematically shows the outer-conductor contact element of FIG. 2 in a front view of an end wall of the transition region;

FIG. 4 schematically shows a plan view of the outer-conductor contact element of FIG. 2;

FIG. 5 schematically shows a perspective view of the outer-conductor contact element of FIG. 2 in an assembly state;

FIG. 6 schematically shows the outer-conductor contact element according to FIG. 5 in a front view of the end wall of the transition region;

FIG. 7 schematically shows the outer-conductor contact element according to FIG. 5 in a sectional perspective view; and FIG. 8 schematically shows an enlarged view of the detail XIII of FIG. 7.

FIG. 1 shows a perspective view of an exemplary right-angle plug connector 1 according to the invention. The right-angle plug connector 1 shown is configured according to the FAKRA standard (FAKRA plug connectors comply with standards ISO 20860-1, ISO 20860-2 and USCAR 17 and 18). In principle, however, any right-angle plug connector can be provided, in particular also a right-angle plug connector of the H-MTD type.

The right-angle plug connector 1 has an outer-conductor contact element 2 and an inner-conductor contact element (not shown) enclosed by the outer-conductor contact element 2. The inner-conductor contact element is accommodated in an insulating part, which is also not shown, and is fastened together with the insulating part in the outer-conductor contact element 2.

For connection to a corresponding mating plug connector (not shown), the right-angle plug connector 1 also has an insulating housing assembly 3, the specific design of which is to be understood to be merely exemplary.

The right-angle plug connector 1 is connected to an electrical cable 4. The electrical cable 4 is inserted into the outer-conductor contact element 2 on the “cable side” for this purpose.

In principle, the invention may be suitable for use with any electrical cable, but particularly preferably the electrical cable 4 is in the form of a coaxial cable and has a cable sheath 5, an outer conductor 6 extending thereunder, preferably a cable shielding braid of individual wires interwoven with one another, an intermediate dielectric layer 7 extending under the outer conductor 6, and precisely one inner conductor 8 guided centrally within the intermediate layer 7.

The outer-conductor contact element according to the invention is shown in FIGS. 2 to 4 in an open preassembly state and in FIGS. 5 to 8 in a closed assembly state, wherein the plug connector components to be assembled in the outer-conductor contact element 2 (in particular the insulating part and the inner-conductor contact element) are hidden in the figures in each case for complete representation of the outer-conductor contact element 2.

As can be seen clearly from FIG. 2, for example, the outer-conductor contact element 2 has a crimping portion 9 for pressing the outer-conductor contact element 2 onto the electrical cable 4. The sleeve-shaped crimping portion 9 has a free end 10 which is open at the front end for receiving the cable 4.

For pressing the crimping portion 9 onto the cable 4, in particular onto the outer conductor 6 or cable shielding braid of the cable 4 and/or a support sleeve, not shown, the crimping portion 9 has two crimping tabs 11 opposite each other. In principle, however, only a single crimping tab 11 may be provided. Starting from an open pre-assembly state (cf. FIGS. 2 to 4), the crimping tabs 11 can be crimped onto the cable 4 until an assembly state is reached (cf. FIGS. 1 and 5 to 8), wherein the crimping tabs 11 in their assembly state allow crimping all around the cable 4 or around its outer conductor 6, as viewed in cross-section. Optionally, the crimping tabs 11 have a mutual toothing that engages with itself in the assembly state of the crimping tabs 11, as shown.

The outer-conductor contact element 2 also has a sleeve-shaped contact portion 12 with a free end 13 which is open at the end face for establishing a connection to the corresponding mating plug connector. The contact portion 12 has a round cross-section, but can in principle also have a cross-section deviating therefrom, for example also an elliptical, rectangular, in particular square cross-section. The cross-section of the contact portion 12 is preferably seamlessly closed.

The outer-conductor contact element 2 also has a trough-shaped transition region 14 which, starting from the crimping portion 9, extends along a second longitudinal axis $L_2$ of the crimping portion 9 to the contact portion 12. An exit angle $\alpha$ is formed between a first longitudinal axis $L_1$ of the contact portion 12 and the second longitudinal axis $L_2$ of the crimping portion 9 (cf. in particular FIG. 7), which in the exemplary embodiments is 90°, but in principle can be arbitrary—depending on the embodiment of the right-angle plug connector 1.

The crimping portion 9, the contact portion 12 and the transition region 14 are formed in one piece from a deep-drawn sheet-metal part. In this way, the electrical and mechanical properties as well as the production of the outer-conductor contact element 2 can be substantially improved compared to the prior art.

The transition region 14 has a base plate 15 (cf. in particular FIG. 4 and FIG. 7) with a recess 16 from which the contact portion 12 extends in the direction of the mating plug connector. On the side of the base plate 15 facing away from the contact portion 12, two opposing side walls 17, each connected to the base plate 15, also run parallel to one another (cf. in particular FIG. 2 and FIG. 5). The side walls 17 transition directly into the crimping portion 9.

Two opposite shielding flaps 18 are also provided in the transition region 14. The shielding flaps 18 can be bent over from an open pre-assembly state (cf. FIGS. 2 to 4), in which an interior of the transition region 14 is accessible in the direction of the side of the base plate 15 facing away from the contact portion 12, to a closed assembly state (cf. FIGS. 5 to 8), wherein the shielding flaps 18 provides a circumferential electromagnetic shield in the transition region 14 when viewed in cross-section in the closed assembly state. Starting from their pre-assembly state, the two shielding flaps 18 can be bent around towards each other into their respective assembly states. In principle, it may also be possible for only a single shielding flap 18 to be provided.

In their pre-assembly state, the shielding flaps 18 extend upwards from the side walls 17 parallel to the first longitudinal axis $L_1$ of the contact portion 12 and, in contrast to the side walls 17 which are orthogonal in the exemplary embodiment, are curved outwards (cf. FIG. 3).

When the shielding flaps 18 are in their assembly state, the transition region 14 forms a substantially semi-elliptical geometry when viewed in cross-section together with the base plate 15 (cf. FIG. 6). In contrast, the crimping portion 9 forms a substantially round geometry in its pressed state on the cable 4.

To improve shielding along the seam 19 that forms in the assembly state (cf. FIG. 5), it is possible to provide that the shielding flaps 18 overlap each other at the seam 19 in the assembly state or are pressed together in such a way that a wedge-shaped seam 19 is formed. A wedge-shaped seam 19 is indicated by a dashed line in FIG. 6.

It can be provided that the transition region 14 has an end wall 21, at an end 20 opposite the free end 10 of the crimping portion 9 along the second longitudinal axis $L_2$ of the crimping portion 9, for providing an end-face electromagnetic shielding. The end wall 21 extends from the side of the base plate 15 facing away from the contact portion 12 and transitions directly into the side walls 17 of the transition region 14.

The end wall 21 forms a completely closed surface, which may, however, have embossments or depressions and elevations. A seam within the surface of the end wall 21 or the formation of the end wall 21 from individual bendable tabs is preferably not provided. By means of the proposed end wall 21, the shielding of the outer-conductor contact element 2 can be substantially improved.

In the assembly state of the shielding flaps 18, the end wall 21 can preferably form a support surface 22 for the shielding flaps 18 (cf. in particular FIGS. 6 to 8). The upper end of the end wall 21 follows a convex course here between the two side walls 17 in order to correspond as closely as possible to the geometric course of the closed shielding flaps 18.

It has been found that, starting from their bent-over, assembly state, the shielding flaps 18 may spring back undesirably due to a certain basic elasticity of the material, as a result of which the axially extending seam 19 between the shielding flaps 18 and the distance between the shielding flaps 18 and the end wall 21 may increase unfavorably. In order to achieve even better plastic deformation and suppress spring-back, the support surface 22 of the end wall 21 preferably has at least one hump-like elevation 23 (cf., for example, FIG. 6), around which one of the shielding flaps 18 can be bent.

It can be provided that the outer-conductor contact element 2 additionally has a contact sleeve 24 which is mountable on or in the contact portion 12, preferably is coaxially mountable. The contact sleeve 24 may have, in the region of its free end, an interface for connection to the corresponding outer-conductor part of the mating plug connector. A corresponding contact sleeve 24 is indicated by dashed lines in FIG. 3 as an example. Instead of a contact sleeve 24, however, it is also possible to provide that the contact portion 12 itself already has the interface for connection to the outer-conductor part of the mating plug connector.

As already mentioned, it is proposed to deep-draw the outer-conductor contact element 2 from a sheet-metal part in order to produce the right-angle plug connector 1. The state of the outer-conductor contact element 2 after the deep-drawing process is shown by way of example in FIG. 2. Preferably, a plurality of outer-conductor contact elements 2 can be connected via a common carrier strip 25 for easier transport or to simplify subsequent assembly processes.

As part of the assembly of the right-angle plug connector 1, the electrical cable 4 can first be pre-assembled with the inner-conductor contact element and, if necessary, the insulating part, and then inserted into the outer-conductor contact element 2, which is still in its pre-assembly state.

Subsequently, the crimping portion 9 can be pressed onto the electrical cable 4 or onto a support sleeve of the electrical cable 4, preferably simultaneously with the bending of the shielding flaps 18. For this purpose, a common pressing tool, in particular a crimping tool, can be used if necessary.

In particular, the crimping portion 9 and the shielding flaps 18 can be pressed or bent over in a controlled manner to adjust the impedance of the right-angle plug connector 1 for its subsequent use during the assembly process.

What is claimed is:

1. An outer-conductor contact element for a right-angle plug connector having a crimping portion for pressing the outer-conductor contact element onto an electrical cable, comprising a crimping portion free end, which is open, for receiving the cable;

a sleeve-shaped contact portion with a contact portion free end, which is open, for establishing a connection to a corresponding mating plug connector, wherein an exit angle is formed between a first longitudinal axis ($L_1$) of the contact portion and a second longitudinal axis ($L_2$) of the crimping portion;

a trough-shaped transition region extending along the second longitudinal axis ($L_2$) and being trough-shaped from the crimping portion to the contact portion (12); and the crimping portion, the contact portion and the transition region formed in one piece from a deep-drawn sheet metal part such that the crimping portion and the contact portion each transition directly and seamlessly into the transition region.

2. The outer-conductor contact element as claimed in claim 1, wherein the transition region has a base plate with a recess from which the contact portion extends in the direction of the mating plug connector, and wherein the transition region on a side of the base plate facing away from the contact portion has two oppositely extending side walls, each connected to the base plate, which transition directly into the crimping portion.

3. The outer-conductor contact element as claimed in claim 2, wherein two opposing shielding flaps are provided, wherein the shielding flaps are bendable towards each other starting from their respective pre-assembly states, in which an interior of the transition region is accessible toward the side of the base plate facing away from the contact portion, to their respective assembly states, in which the shielding flaps provide a circumferential electromagnetic shield in the transition region when viewed in cross-section, to provide the circumferential electromagnetic shielding.

4. The outer-conductor contact element as claimed in claim 3, wherein the shielding flaps are pressed together in such a way that a wedge-shaped seam is formed.

5. The outer-conductor contact element as claimed in claim 3, wherein each shielding flap has a semicircular or semi-elliptical course in its assembly state.

6. The outer-conductor contact element as claimed in claim 1, wherein the transition region has an end wall, at an end opposite the crimping portion free end along the second longitudinal axis ($L_2$) of the crimping portion, for providing end-face electromagnetic shielding.

7. The outer-conductor contact element as claimed in claim 6, wherein the transition region on the side of the base plate facing away from the contact portion has two oppositely extending side walls, each connected to the base plate, which transition directly into the crimping portion, and wherein the end wall extends starting from the side of the base plate facing away from the contact portion and transitions directly into the side walls of the transition region.

8. The outer-conductor contact element as claimed in claim 6, wherein the end wall forms a completely closed surface.

9. The outer-conductor contact element as claimed in claim 6, wherein the transition region has at least one shielding flap formed on a side of the base plate facing away from the contact portion, wherein the at least one shielding flap can be bent from an open preassembly state, in which an interior of the transition region is accessible toward the side of the base plate facing away from the contact portion, to a closed assembly state, in which the at least one shielding flap provides a circumferential electromagnetic shield in the transition region when viewed in cross-section, and wherein the end wall forms a support surface for the at least one shielding flap in the assembly state of the at least one shielding flap.

10. The outer-conductor contact element as claimed in claim 6, wherein the transition region on the side of the base plate facing away from the contact portion has two oppositely extending side walls, each connected to the base plate, which transition directly into the crimping portion, and wherein the end of the end wall facing away from the base plate has a convex course between the two side walls.

11. The outer-conductor contact element as claimed in claim 9, wherein the support surface of the end wall has at least one hump-like elevation around which one of the shielding flaps can be bent.

12. The outer-conductor contact element as claimed in claim 1, wherein the crimping portion has at least one crimping tab, wherein the crimping tab is pressable on the cable starting from an open pre-assembly state until an assembly state is reached in which the at least one crimping tab forms a circumferential pressing on the cable as viewed in cross-section.

13. The outer-conductor contact element as claimed in claim 1, wherein the contact portion has a seamlessly closed cross-section.

14. The outer-conductor contact element as claimed in claim 1, further comprising a contact sleeve which can be mounted on or in the contact portion and which, in the region of its free end, has an interface for connection to a corresponding outer-conductor part of the mating plug connector.

15. A method for producing a right-angle plug connector, according to which an outer-conductor contact element is deep-drawn from a sheet-metal part in such a way that the outer-conductor contact element subsequently has

- a crimping portion for pressing the outer-conductor contact element onto an electrical cable, with a crimping portion free end, which is open, for insertion of the cable;
- a sleeve-shaped contact portion for establishing a connection to a corresponding mating plug connector, with a contact portion free end which faces the mating plug connector and is open, wherein an exit angle is formed between a first longitudinal axis ($L_1$) of the contact portion and a second longitudinal axis ($L_2$) of the crimping portion; and
- a trough-shaped transition region that extends along the second longitudinal axis ($L_2$) and is trough-shaped from the crimping portion to the contact portion.

16. The method as claimed in claim 15, wherein a contact sleeve is mounted on or in the contact portion, wherein the contact sleeve has an interface for connection to a corresponding outer-conductor part of the mating plug connector.

17. The method as claimed in claim 15, wherein an insulating part and/or an inner-conductor contact element are inserted into the outer-conductor contact element, wherein furthermore a pre-assembled electrical cable is inserted with its free end into the outer-conductor contact element, and wherein the crimping portion is subsequently pressed onto the electrical cable.

18. The method as claimed in claim 17, wherein simultaneously with the pressing of the crimping portion, the at least one shielding flap of the transition region is bent over from a pre-assembly state into an assembly state in which the at least one shielding flap provides a circumferential electromagnetic shielding in the transition region, as viewed in cross-section.

19. The method as claimed in claim 18, wherein the crimping portion and the at least one shielding flap are pressed or bent over using a common pressing tool, in particular a crimping tool.

20. An outer-conductor contact element for a right-angle plug connector having

- a crimping portion for pressing the outer-conductor contact element onto an electrical cable, comprising a crimping portion free end, which is open, for receiving the cable;
- a sleeve-shaped contact portion with a contact portion free end, which is open, for establishing a connection to a corresponding mating plug connector, wherein an exit angle is formed between a first longitudinal axis ($L_1$) of the contact portion and a second longitudinal axis ($L_2$) of the crimping portion;

a trough-shaped transition region extending from the crimping portion along the second longitudinal axis ($L_2$) of the crimping portion to the contact portion (12); and the crimping portion, the contact portion and the transition region formed in one piece from a deep-drawn sheet metal part such that the crimping portion and the contact portion each transition directly and seamlessly into the transition region;

wherein the transition region has a base plate with a recess from which the contact portion extends in the direction of the mating plug connector, and wherein the transition region on the side of the base plate facing away from the contact portion has two oppositely extending side walls, each connected to the base plate, which extend upwardly from the base plate and which transition directly into the crimping portion, and between which said recess is located.

* * * * *